(12) United States Patent
Grablowitz et al.

(10) Patent No.: US 10,752,727 B1
(45) Date of Patent: Aug. 25, 2020

(54) PROCESS AND APPARATUS FOR CONTINUOUS PRODUCTION OF AQUEOUS POLYURETHANE DISPERSIONS

(71) Applicant: Covestro Deutschland AG, Leverkusen (DE)

(72) Inventors: Hans Georg Grablowitz, Köln (DE); Alexander Pross, Köln (DE); Reiner Witkowski, Bottrop (DE); Holger Breuer, Kaarst (DE); Sven Gestermann, Leverkusen (DE); Christian Joachim Hahn, Leverkusen (DE); Stephan Schubert, Leverkusen (DE); Joachim Ritter, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 121 days.

(21) Appl. No.: 15/743,342

(22) PCT Filed: Jul. 7, 2016

(86) PCT No.: PCT/EP2016/066078
§ 371 (c)(1),
(2) Date: Jan. 10, 2018

(87) PCT Pub. No.: WO2017/009161
PCT Pub. Date: Jan. 19, 2017

(30) Foreign Application Priority Data

Jul. 10, 2015 (EP) .................................. 15176287

(51) Int. Cl.
| | | |
|---|---|---|
| *C08G 18/42* | (2006.01) | |
| *C08G 18/08* | (2006.01) | |
| *C08G 18/75* | (2006.01) | |
| *C08G 18/44* | (2006.01) | |
| *C08G 18/73* | (2006.01) | |

(52) U.S. Cl.
CPC ..... *C08G 18/4238* (2013.01); *C08G 18/0828* (2013.01); *C08G 18/0895* (2013.01); *C08G 18/44* (2013.01); *C08G 18/73* (2013.01); *C08G 18/755* (2013.01); *C08G 18/758* (2013.01)

(58) Field of Classification Search
CPC ............ C08G 18/4238; C08G 18/0828; C08G 18/0895; C08G 18/44; C08G 18/73; C08G 18/755; C08G 18/758
USPC ......................................................... 524/839
See application file for complete search history.

(56) References Cited

U.S. PATENT DOCUMENTS

| | | | |
|---|---|---|---|
| 4,857,565 A | 8/1989 | Henning et al. | |
| 4,879,322 A | 11/1989 | Markusch et al. | |
| 4,921,842 A | 5/1990 | Henning et al. | |
| 6,087,440 A | 7/2000 | Skaggs et al. | |
| 6,767,958 B2 | 7/2004 | Laas et al. | |
| 7,934,865 B2 | 5/2011 | Ehrfeld et al. | |
| 2010/0273939 A1 | 10/2010 | Stollmaier et al. | |

FOREIGN PATENT DOCUMENTS

| | | | |
|---|---|---|---|
| CA | 2253119 A1 | 5/1999 | |
| CN | 204395871 U | 6/2015 | |
| DE | 2311635 A1 | 9/1974 | |
| DE | 2344135 A1 | 3/1975 | |
| DE | 2446440 A1 | 4/1976 | |
| DE | 3603996 A1 | 8/1987 | |
| EP | 0303907 A1 | 2/1989 | |
| EP | 0916647 A2 | 5/1999 | |
| EP | 1666132 A1 | 6/2006 | |
| GB | 1428907 A | 3/1976 | |
| GB | 1432112 A | 4/1976 | |
| GB | 1462597 A | 1/1977 | |
| TW | 200936624 A | 9/2009 | |
| WO | WO-0188006 A1 | 11/2001 | |
| WO | WO-2005097858 A1 | 10/2005 | |

OTHER PUBLICATIONS

International Search Report for PCT/EP2016/066078 dated Nov. 11, 2016.
Written Opinion of the International Searching Authority for PCT/EP2016/066078 dated Nov. 11, 2016.

*Primary Examiner* — Hui H Chin
(74) *Attorney, Agent, or Firm* — Faegre Drinker Biddle & Reath LLP

(57) ABSTRACT

The application relates to a process for continuously producing aqueous polyurethane dispersions, which is characterized by the use of micro structured mixing elements and addition of water twice during the dispersion step. The energy input in the mixing of the dispersion is low. In addition, the application describes an apparatus suitable for execution of the aforementioned process.

10 Claims, 1 Drawing Sheet

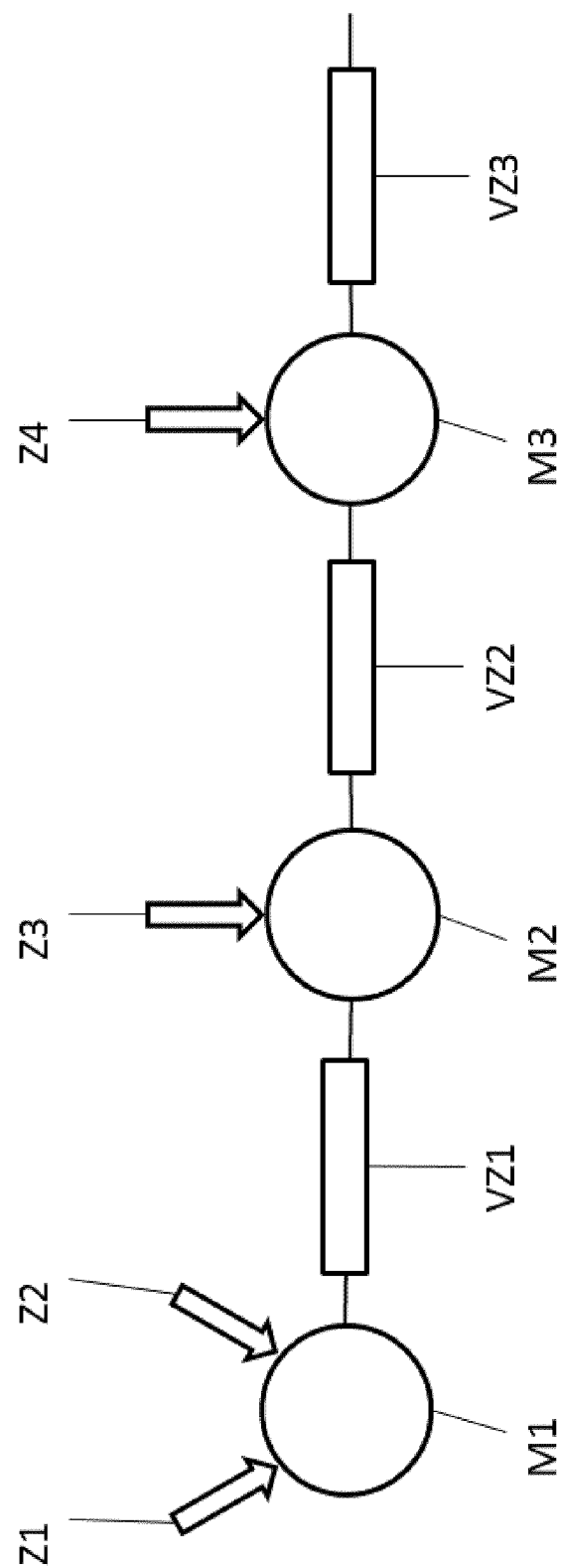

PROCESS AND APPARATUS FOR CONTINUOUS PRODUCTION OF AQUEOUS POLYURETHANE DISPERSIONS

CROSS-REFERENCE TO RELATED APPLICATIONS

This application is a national stage application (under 35 U.S.C. § 371) of PCT/EP2016/066078, filed Jul. 7, 2016, which claims benefit of European Application No. 15176287.9, filed Jul. 10, 2015, both of which are incorporated herein by reference in their entirety.

The application relates to a process for continuously producing aqueous polyurethane dispersions, which is characterized by the use of microstructured mixing elements and addition of water twice during the dispersion step. The energy input in the mixing of the dispersion is low. In addition, the application describes an apparatus suitable for execution of the aforementioned process.

TECHNICAL BACKGROUND

At present, aqueous polyurethane dispersions (PUDs) are being developed and produced in a batchwise process. The scale-up from laboratory to pilot and production scale always gives rise to problems which entail production shutdowns and reject product. Furthermore, the current batchwise processes offer only limited flexibility in production volumes, and these are ultimately limited by a finite number of different sizes of vessel.

The processes described to date for continuous production of PUDs are characterized in that the production of stable dispersions requires high energy inputs. The associated shear forces impair the structural integrity of the polymers present in the dispersion.

DE 2311635 describes a continuous process for producing PUDs using a centrifugal homogenizing unit. In this process, a prepolymer, chain extender and the aqueous phase are combined in a zone of high turbulence and an aqueous PUD is obtained. Thus, a mechanical mixing unit with high energy input is used.

OS 2344135 describes a continuous process for producing PUDs using a countercurrent injector. It is described as being advantageous that no mechanically moving parts are utilized for the mixing and a higher energy supply compared to known processes is enabled.

EP 0303907 describes a continuous process for producing PUDs using a cocurrent nozzle. It is described as being advantageous that just one of the two fluids has to be compressed to high supply pressure (20-500 bar) for a high energy input.

U.S. Pat. No. 4,879,322 describes a process for continuously producing PUDs, in which a stator-rotor construction is used. The process aims for low energy inputs during the mixing operation.

Thus, the following problems were addressed by the present invention: development of an economically viable process which features simple scalability, i.e. with low proneness to faults, from laboratory scale through the pilot plant up to production. In addition, the process should feature elevated flexibility in terms of the production volumes. At the same time, it was important to avoid high energy inputs in the mixing of reactants, in order to avoid damage to the reaction product. The PUDs produced were to have a high stability in the mixing in spite of the low energy input.

This problem is solved by the embodiments described in the claims and the description.

Process

In a first embodiment, the invention relates to a process for continuously producing aqueous polyurethane dispersions, comprising the steps of a) simultaneously introducing at least one prepolymer and at least one chain-extending reagent into a mixing element M1;
b) subsequently simultaneously introducing the chain-extended prepolymer formed in process step a) and water into a mixing element M2; and
c) subsequently simultaneously introducing the mixture formed in process step b) and water into a mixing element M3 to form an aqueous polyurethane dispersion.

The process steps are preferably executed in the sequence a), b) and then c).

In this embodiment, in process step a), a chain-extended prepolymer is first formed, and is then dispersed in water in two further process steps b) and c).

In a second embodiment, the invention relates to a process for continuously producing aqueous polyurethane dispersions, comprising the steps of a) simultaneously introducing at least one prepolymer and water into a mixing element M1;
b) subsequently simultaneously introducing the mixture formed in process step a) and water into a mixing element M2; and
c) subsequently simultaneously introducing the mixture formed in process step b) and at least one chain-extending reagent into a mixing element M3 to form an aqueous chain-extended polyurethane dispersion.

The process steps are preferably executed in the sequence a), b) and then c).

In this embodiment, the prepolymer is first dispersed in water in process steps a) and b). Subsequently, the dispersed prepolymer is chain-extended in process step c).

In both embodiments, the process may comprise, as process step a1), b1) or c1), the flow of the mixture produced in the respective mixing element through a delay zone. In process step a1), the flow is through delay zone VZ1. In process step b1), the flow is through delay zone VZ2. In process step c1), the flow is through delay zone VZ3.

In a more preferred embodiment, the process comprises process steps a1) and b1), a1) and c1) or b1) and c1). In the most preferred embodiment, the process comprises process steps a1), b1) and c1).

The duration of the flow through a delay zone may be matched to the demands of the particular reaction. This can be achieved in accordance with the invention either by a change in the volume of the delay zone or by a change in the flow rate. A combination of changes in both parameters is also possible in accordance with the invention. Particular preference is given to adjusting the residence time by changing the length of the delay zone. This is particularly advantageous because it is only necessary here to adjust the pipe length of the delay zone without altering other reaction parameters.

The preferred residence times are found from the duration required for stable dispersion of the prepolymer or the chain-extended prepolymer or for the chain extension.

The prepolymer has preferably been dissolved in an organic solvent.

Suitable solvents are entirely or partly miscible with water in the temperature range of 20° C.-120° C., are unreactive with respect to isocyanate groups and can optionally be removed by distillation after the dispersion has been produced. Moreover, it is also possible to use, in addition to the aforementioned solvents, further water-immiscible or sparingly water-miscible solvents which are unreactive with respect to isocyanate groups. Also suitable are solvent mixtures of two or more solvents which meet the aforementioned conditions for production of the dispersions according to the invention. In a further preferred embodiment of the invention, rather than the solvents, it is also possible to use monomers containing acrylate groups as reactive diluents.

Suitable water-miscible solvents contain at least one oxygen and/or nitrogen atom and/or sulphur atom. Preference is given to keto-functional solvents, hydroxy-functional solvents, ether-functional solvents, ester-functional solvents, lactones, mixed ether- and ester-functional solvents, carbonate-functional solvents, polar nitrogen-containing solvents and sulphur-containing solvents.

Preferred keto-functional solvents are acetone and butanone. Preferred hydroxy-functional solvents are ethanol and isopropanol. Preferred ether-functional solvents are tetrahydrofuran, dioxane and dipropylene glycol monomethyl ether. Preferred ester-functional solvents are ethyl acetate and butyl acetate. A preferred lactone is caprolactone. A preferred mixed ether- and ester-functional solvent is methoxypropyl acetate. A preferred carbonate-functional solvent is dimethyl carbonate. Preferred nitrogen-containing solvents are 1-methyl-2-pyrrolidone, the higher homologues thereof and dimethylacetamide. A preferred sulphur-containing solvent is dimethyl sulphoxide.

Suitable water-immiscible or sparingly water-miscible solvents are frequently apolar and do not necessarily contain a heteroatom. Preference is given to toluene, xylene, cyclohexane, chlorobenzene and mixtures of substituted aromatic compounds, for example Solvent Naphtha which is commercially available.

Suitable acrylate monomers as reactive diluents contain at least one free-radically polymerizable double bond and are unreactive toward isocyanate compounds. Preference is given to methyl methacrylate or butyl acrylate. Monomers containing vinyl groups, such as styrene, are likewise usable. These reactive diluents typically remain in the dispersion and can be free-radically polymerized in a further reaction step, so as to give rise to an essentially solvent-free dispersion.

The suitable solvents may be added not just on commencement of the preparation but optionally also in portions at a later stage. Preference is given to entirely or partly water-miscible solvents, greater preference to acetone and butanone and particular preference to acetone.

Mixing Element

In the above-described first preferred embodiment of the process according to the invention, the mixing element M2 is preferably a static mixing element. More preferably, the mixing elements M2 and M3 are static mixing elements. Most preferably, the mixing elements M1, M2 and M3 are static mixing elements.

In the above-described second preferred embodiment of the process according to the invention, the mixing element M1 is preferably a static mixing element. More preferably, mixing elements M1 and M2 are static mixing elements. Most preferably, the mixing elements M1, M2 and M3 are static mixing elements.

"Static mixing element" is understood to mean a mixing element where the mixing of the two liquid streams is achieved without the involvement of moving parts. The mixing without involvement of moving parts does not mean that the mixing element cannot contain at least one non-return valve as a moving part.

The mixing elements according to the invention are preferably constructed such that the liquid streams to be mixed are conducted alongside one another in laminar flow, such that the mixing proceeds by diffusion and not by turbulence. Hence, it is preferred that the direction of flow of both streams does not differ by more than 20°, more preferably not more than 10°.

Preferably, the mixing of the liquid streams is promoted by microstructures which divide one or both streams into substreams before or during the meeting of the substreams. This can be accomplished, for example, by virtue of the first stream being divided by the microstructures into substreams which then penetrate into the second stream. The microstructures may be designed such that both streams or substreams formed therefrom have a difference in velocity when they meet. Such a mixing element is also referred to in this application as "microstructured mixing element".

The dimensions of the microstructures are determined by the interplay of pressure drop at the mixing element and the viscosity of the liquids to be mixed. If the dimensions are reduced with equal viscosity of the liquid, the pressure drop at the mixing element becomes greater. Conversely, a decreasing viscosity of the liquid with the same dimensions of the microstructure leads to a falling pressure drop at the mixing element. The viscosity of liquids, especially the viscosity of the prepolymer solution, is preferably adjusted via the ratio of prepolymer to solvent. Consequently, the dimensions of the microstructures and the viscosity of liquids have to be chosen such that the pressure drop at the mixing element does not exceed a value of 40 bar, more preferably 20 bar and most preferably 10 bar.

In a particularly preferred embodiment, at least one of the two channels for one of the two liquid streams has a backflow barrier. This preferably takes the form of a non-return valve or of a membrane arrangement.

Very particular preference is given to mixing elements as described in European patent application EP 1666132.

The mixing in said mixing element is characterized in that the pressure drop at the mixing element is low. This corresponds to a low energy input. The energy input at one of the mixing elements according to the invention is preferably below 20 W/cm$^3$, more preferably below 10 W/cm$^3$, even more preferably below 5 W/cm$^3$, even more preferably below 2.5 W/cm$^3$ and most preferably below 1 W/cm$^3$.

The total amount of water added in the dispersion is preferably divided such that 1% to 99% by weight of the total water added is added at the first mixing element, which is utilized for addition of water, and 99% to 1% by weight of the total water added at the second mixing element, the total amount of water added corresponding to 100%. Preferably, the amount of water added at the first mixing element is 20% to 70% by weight of the total amount of water added, the total amount of the water added at the two mixing elements corresponding to 100%. More preferably, the amount of water added at the first mixing element is 30%-55% by weight of the total amount of water added, the total amount of the water added at the two mixing elements corresponding to 100%. The precise distribution of the total amount of water added to the two mixing elements may vary depending on the properties of the polyurethane dispersion in question. However, this parameter can simply be determined by a series of experiments which employs different distributions so that no inventive activity is required.

Preferably, the total amount of water added is such that the dissolved prepolymer makes up 30% to 60% by weight, more preferably 40% to 50% by weight, of the finished dispersion, preferably after partial or complete removal of the solvent(s).

In the first embodiment, M2 and M3 are the first and second mixing element for the addition of water. In the second embodiment, M1 and M2 are the first and second mixing element for the addition of water.

In a particularly preferred embodiment, in one or more of process steps a1), b1) and c1), an organic solvent is additionally supplied. The organic solvent is preferably one which is miscible with solvent in which one of the prepolymers has been dissolved. It is more preferable that the organic solvent is that in which at least one of the prepolymers has been dissolved.

Prepolymers

The prepolymers suitable for the invention are preferably the reaction products of one or more polyisocyanates with one or more isocyanate-reactive compounds, the polyisocyanate(s) being used in a stoichiometric excess, such that the prepolymer has terminal isocyanate groups.

The suitable prepolymers may additionally be divided into hydrophobic and hydrophilic prepolymers. Hydrophobic prepolymers refer to those compounds which do not have any hydrophilic groups and thus cannot be dissolved or dispersed in water. Hydrophilic prepolymers refer to those compounds which have covalently bonded hydrophilic groups which enable dissolution or dispersion of the prepolymer in water.

Suitable polyisocyanates are aromatic, araliphatic, aliphatic or cycloaliphatic polyisocyanates. It is also possible to use mixtures of such polyisocyanates. Preferred polyisocyanates are selected from the group consisting of butylene diisocyanate, hexamethylene diisocyanate (HDI), pentamethylene 1,5-diisocyanate, isophorone diisocyanate (IPDI), 2,2,4- and/or 2,4,4-trimethylhexamethylene diisocyanate, the isomeric bis(4,4'-isocyanatocyclohexyl)methanes or mixtures thereof with any isomer content, isocyanatomethyloctane 1,8-diisocyanate, cyclohexylene 1,4-diisocyanate, phenylene 1,4-diisocyanate, tolylene 2,4- and/or 2,6-diisocyanate, naphthylene 1,5-diisocyanate, diphenylmethane 2,4'- or 4,4'-diisocyanate, triphenylmethane 4,4',4''-triisocyanate and derivatives thereof with urethane, isocyanurate, allophanate, biuret, uretdione, iminooxadiazinedione structure. Preference is further given to mixtures thereof. Particular preference is given to hexamethylene diisocyanate, isophorone diisocyanate and the isomeric bis(4,4'-isocyanatocyclohexyl)methanes and mixtures thereof.

Isocyanate-reactive polyol in the context of the present invention refers to a compound having 1-4 isocyanate-reactive groups, preferably 1.5-2.5 and most preferably 1.9-2.1. Suitable isocyanate-reactive groups are groups known to those skilled in the art, preferably hydroxyl groups, amine groups, hydrazide groups or thiol groups, more preferably hydroxyl groups or amino groups, most preferably hydroxyl groups.

The molar mass of the suitable polyols is between 40 g/mol and 13000 g/mol, and suitable polyols are discrete compounds of low molecular weight and/or polydisperse compounds of higher molecular weight. The low molecular weight compounds are typically discrete compounds in the molar mass range between 40 and 499 g/mol. The higher molecular weight compounds are compounds which have a molecular weight distribution and a mean number-average molar mass between 500 and 13000, preferably between 700 g/mol and 4000 g/mol, most preferably between 1000 g/mol and 3000 g/mol.

Suitable low molecular weight polyols are short-chain (i.e. those containing 2 to 20 carbon atoms) aliphatic, araliphatic or cycloaliphatic compounds. Examples of diols are ethylene glycol, diethylene glycol, triethylene glycol, tetraethylene glycol, dipropylene glycol, tripropylene glycol, propane-1,2-diol, propane-1,3-diol, butane-1,4-diol, neopentyl glycol, 2-ethyl-2-butylpropanediol, trimethylpentanediol, positionally isomeric diethyloctanediols, 1,3-butylene glycol, cyclohexanediol, cyclohexane-1,4-dimethanol, hexane-1,6-diol, cyclohexane-1,2- and -1,4-diol, hydrogenated bisphenol A (2,2-bis(4-hydroxycyclohexyl)propane), 2,2-dimethyl-3-hydroxypropyl 2,2-dimethyl-3-hydroxypropionate. Preference is given to butane-1,4-diol, cyclohexane-1,4-dimethanol and hexane-1,6-diol. Examples of suitable triols are trimethylolethane, trimethylolpropane or glycerol, preference being given to trimethylolpropane.

Examples of diamines are ethylene-1,2-diamine, hexamethylene-1,6-diamine, butane-1,4-diamine and isophoronediamine, particular preference being given to ethylene-1,2-diamine and isophoronediamine. Examples of dihydrazides are oxalic dihydrazide, carbohydrazide and adipic dihydrazide, particular preference being given to carbohydrazide and adipic dihydrazide. Examples of dithiols are ethane-1,2-dithiol, propane-1,3-dithiol, butane-1,4-dithiol and hexane-1,6-dithiol. Particular preference is given to ethane-1,2-dithiol and hexane-1,6-dithiol.

Low molecular weight compounds used are preferably diols.

The higher molecular weight compounds are compounds which are in turn formed from monomers and which, as well as the usually terminal isocyanate-reactive end groups, have further functional groups along the main chain.

Suitable higher molecular weight polyols are polyester polyols, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polyurethane polycarbonate polyols and polyester polycarbonate polyols, polyether polyamines and polyamidopolyamines, particular preference being given to polyester polyols, polyether polyols and polycarbonate polyols, particular preference being given to polyester polyols.

The suitable polyester polyols are frequently formed from one or more aliphatic and aromatic and/or araliphatic dicarboxylic acids with one or more aliphatic and aromatic and/or araliphatic diols and are prepared via a polycondensation process.

Polyester polyols of good suitability are the known polycondensates of di- and optionally tri- and tetraols and di- and optionally tri- and tetracarboxylic acids or hydroxycarboxylic acids or lactones. Rather than the free polycarboxylic acids, it is also possible to use the corresponding polycarboxylic anhydrides or corresponding polycarboxylic esters of lower alcohols to prepare the polyesters. Examples of suitable diols are ethylene glycol, butylene glycol, diethylene glycol, triethylene glycol, polyalkylene glycols such as polyethylene glycol, and additionally propane-1,2-diol, propane-1,3-diol, butane-1,3-diol, butane-1,4-diol, hexane-1,6-diol and isomers, neopentyl glycol or neopentyl glycol hydroxypivalate, preference being given to the three latter compounds. In order to achieve a functionality of 2, it is also possible to use proportionate amounts of polyols having a functionality of 3, for example trimethylolpropane, glycerol, erythritol, pentaerythritol, trimethylolbenzene or trishydroxyethyl isocyanurate.

Preferred dicarboxylic acids are phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, succinic acid, 3,3-diethylglutaric acid, 2,2-dimethylsuccinic acid. Anhydrides of these acids are likewise usable, insofar as they exist. For the purposes of the present invention, the anhydrides are consequently encompassed by the expression "acid". Preference is also given to using monocarboxylic acids such as benzoic acid and hexanecarboxylic acid, provided that the mean functionality of the polyol is ≥2. Saturated aliphatic or aromatic acids are preferred, such as adipic acid or isophthalic acid. As a polycarboxylic acid for optional additional use in relatively small amounts, mention should be made here of trimellitic acid.

Hydroxycarboxylic acids suitable as reaction participants in the preparation of a polyester polyol having terminal hydroxyl groups are, for example, hydroxycaproic acid, hydroxybutyric acid, hydroxydecanoic acid, hydroxystearic acid and the like. Usable lactones include ε-caprolactone, butyrolactone and homologues.

Preference is given to polyester polyols based on butanediol and/or neopentyl glycol and/or hexanediol and/or ethylene glycol and/or diethylene glycol with adipic acid and/or phthalic acid and/or isophthalic acid. Particular preference is given to polyester polyols based on butanediol and/or neopentyl glycol and/or hexanediol with adipic acid and/or phthalic acid.

Polyether polyols include, for example, the polyaddition products of the styrene oxides, of ethylene oxide, propylene oxide, tetrahydrofuran, butylene oxide, epichlorohydrin, and the mixed addition and grafting products thereof, and the polyether polyols obtained by condensation of polyhydric alcohols or mixtures thereof and those obtained by alkoxylation of polyhydric alcohols, amines and amino alcohols.

Suitable hydroxy-functional polyethers have OH functionalities of 1.5 to 6.0, preferably 1.8 to 3.0, OH members of 50 to 700 and preferably of 100 to 600 mg KOH/g of solids and molecular weights $M_n$ of 106 to 4000 g/mol, preferably of 200 to 3500, for example alkoxylation products of hydroxy-functional starter molecules such as ethylene glycol, propylene glycol, butanediol, hexanediol, trimethylolpropane, glycerol, pentaerythritol, sorbitol or mixtures of these and also other hydroxy-functional compounds with propylene oxide or butylene oxide. Preferred polyether components b) are polypropylene oxide polyols and polytetramethylene oxide polyols having a molecular weight of 300 to 4000 g/mol. In this case, the polyether polyols of particularly low molecular weight may be water-soluble in the case of correspondingly high OH contents. However, particular preference is given to water-insoluble polypropylene oxide polyols and polytetramethylene oxide polyols having a molar mass of 500-3000 g/mol and mixtures thereof.

The useful polycarbonate polyols are obtainable by reaction of carbonic acid derivatives, for example diphenyl carbonate, dimethyl carbonate or phosgene, with diols. Useful diols of this kind include, for example, ethylene glycol, propan-1,2- and -1,3-diol, butane-1,3- and 1,4-diol, hexane-1,6-diol, octane-1,8-diol, neopentyl glycol, 1,4-bis-hydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, tetrabromobisphenol A, but also lactone-modified diols. The diol component preferably contains 40% to 100% by weight of hexane-1,6-diol and/or hexanediol derivatives, preferably those having ether or ester groups as well as terminal OH groups, for example products which are obtained by reaction of 1 mol of hexanediol with at least 1 mol, preferably 1 to 2 mol, of ε-caprolactone or by etherification of hexanediol with itself to give di- or trihexylene glycol. It is also possible to use polyether polycarbonate polyols.

Preference is given to polycarbonate polyols b) based on dimethyl carbonate and hexanediol and/or butanediol and/or ε-caprolactone. Very particular preference is given to polycarbonate polyols based on dimethyl carbonate and hexanediol and/or ε-caprolactone.

The hydrophilic prepolymers further contain ionic groups and/or nonionic hydrophilic groups in order to assure adequate dispersion of the resulting polyurethane dispersion in water. The ionic groups may either be cationic or anionic in nature. Cationically, anionically or nonionically dispersing compounds are those which contain, for example, sulphonium, ammonium, phosphonium, carboxylate, sulphonate, phosphonate groups or the groups which can be converted to the aforementioned groups by salt formation (potentially ionic groups) or polyether groups and can be incorporated into the macromolecules via isocyanate-reactive groups present. The neutralizing agents needed for salt formation may be added either in a stoichiometric amount or in deficiency in relation to the salt-forming group. To create anionic groups, organic bases such as tertiary amines or inorganic bases such as alkali metal hydroxides or ammonia are added. Preference is given here to using tertiary amines such as triethylamine, triethanolamine or dimethylethanolamine. Preferred suitable isocyanate-reactive groups are hydroxyl and amine groups.

Suitable ionic or potentially ionic compounds are, for example, mono- and dihydroxycarboxylic acids, dihydroxydicarboxylic acids, mono- and diaminocarboxylic acids, mono- and dihydroxysulphonic acids, mono- and diaminosulphonic acids and mono- and dihydroxyphosphonic acids or mono- and diaminophosphonic acids and salts thereof, such as dimethylolpropionic acid, dimethylolbutyric acid, hydroxypivalic acid, N-(2-aminoethyl)alanine, 2-(2-aminoethylamino)ethanesulphonic acid, ethylene-diaminepropyl- or -butylsulphonic acid, propylene-1,2- or 1,3-diamineethylsulphonic acid, malic acid, citric acid, glycolic acid, lactic acid, glycine, alanine, taurine, lysine, 3,5-diaminobenzoic acid, an addition product of IPDI and acrylic acid (EP-A 0 916 647, example 1) and the alkali metal and/or ammonium salts thereof; the adduct of sodium bisulphite onto but-2-ene-1,4-diol, polyethersulphonate, the propoxylated adduct of but-2-enediol and $NaHSO_3$, described, for example, in DE-A 2 446 440 (page 5-9, formula I-III) and units that can be converted to cationic groups, such as N-methyldiethanolamine, as hydrophilic formation components. Preferred ionic or potentially ionic compounds are those having carboxyl or carboxylate and/or sulphonate groups and/or ammonium groups.

Preferred compounds are polyethersulphonate, dimethylolpropionic acid, tartaric acid and dimethylolbutyric acid, particular preference being given to polyethersulphonate and dimethylolpropionic acid.

Suitable nonionically hydrophilizing compounds are, for example, polyoxyalkylene ethers containing at least one hydroxyl or amino group. These polyethers contain a proportion of 30% by weight to 100% by weight of units derived from ethylene oxide. Useful polyethers include polyethers of linear structure having a functionality between 1 and 3, but also compounds of the general formula (I)

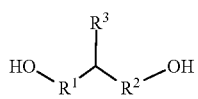 (I)

in which

R1 and R2 are each independently a divalent aliphatic, cycloaliphatic or aromatic radical which has 1 to 18 carbon atoms and may be interrupted by oxygen and/or nitrogen atoms, and R3 is an alkoxy-terminated polyethylene oxide radical.

Nonionically hydrophilizing compounds are, for example, also monovalent polyalkylene oxide polyether alcohols having a statistical average of 5 to 70 and preferably 7 to 55 ethylene oxide units per molecule, as obtainable in a manner known per se by alkoxylation of suitable starter molecules (for example in Ullmanns Encyclopadie der technischen Chemie [Ullmann's Encyclopedia of Industrial Chemistry], 4th edition, volume 19, Verlag Chemie, Weinheim p. 31-38).

Suitable starter molecules are, for example, saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, for example diethylene glycol monobutyl ether, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine and heterocyclic secondary amines such as morpholine, pyrrolidine, piperidine or 1H-pyrazole. Preferred starter molecules are saturated monoalcohols. Particular preference is given to using diethylene glycol monobutyl ether as starter molecule.

Alkylene oxides suitable for the alkoxylation reaction are especially ethylene oxide and propylene oxide, which can be used in any sequence or else in a mixture in the alkoxylation reaction.

The polyalkylene oxide polyether alcohols are either pure polyethylene oxide polyethers or mixed polyalkylene oxide polyethers wherein the alkylene oxide units consist to an extent of at least 30 mol % and preferably to an extent of at least 40 mol % of ethylene oxide units. Preferred nonionic compounds are monofunctional mixed polyalkylene oxide polyethers having at least 40 mol % of ethylene oxide and not more than 60 mol % of propylene oxide units.

Particular preference is given to monohydroxy-functional alkoxy polyethylene glycols, for example MPEG 750 (Dow Chemical) and LB 25 (Covestro), and dihydroxy-functional compounds having lateral polyethylene oxide units, for example Ymer N 120 (Perstorp) or Tegomer D 3404.

The molar ratio of NCO to isocyanate-reactive groups may vary here from 1.05-4.00, preferably from 1.2-3.0, more preferably from 1.4-2.5. The prepolymers are prepared by initially charging the appropriate polyol or a mixture of different polyols in a reaction vessel and then adding the polyisocyanate or the mixture of polyisocyanates at elevated temperature. When mixtures of polyols and/or polyisocyanates are used, the individual co-reactants may also be added at different times in order to achieve a controlled structure of the prepolymer. In this case, the reaction can be effected either in the melt or else in suitable inert solvents, for example acetone or butanone. The reaction temperature here is between 50° C. and 130° C. and the reaction time is 1 h-24 h. The urethanization reaction can be accelerated by using suitable catalysts. Suitable catalysts for this purpose are those known to those skilled in the art, for example triethylamine, 1,4-diazabicyclo[2.2.2]octane, tin dioctoate, dibutyltin dilaurate or bismuth dioctoate, which are included in the initial charge or metered at a later stage. Preference is given to dibutyltin dilaurate. The reaction has typically ended when there is no longer any change in the NCO content; the reaction is typically monitored by titration. In order to assure the further processing of the prepolymer, prepolymers of low viscosity are generally advantageous, for which purpose, if this has not already occurred during the preparation, the prepolymer is dissolved in a suitable solvent. Low-viscosity prepolymers or prepolymer solutions refer to those systems having a viscosity at a shear rate of 40 $s^{-1}$ of <104 mPas. The prepolymer solution here preferably has a solids content of >40% and a preferred solvent is acetone.

The prepolymer can be prepared in a batchwise process, but it is also possible to use a continuous process. In the case of hydrophilic prepolymers having potentially ionic groups, the salt can be formed directly after the reaction has ended, but it is also possible to conduct the salt formation in one of the subsequent process steps.

In a particularly preferred embodiment, at least 2, 3, 4 or 5 prepolymers are introduced into mixing element 1.

Chain-Extending Reagent

Chain extension of the prepolymers can be accomplished especially using amines having no ionic or ionogenic groups, such as anionically hydrophilizing groups (component 131) hereinafter), and it is possible to use amines having ionic or ionogenic groups, such as anionically hydrophilizing groups in particular (component B2) hereinafter). Preference is given to using a mixture of component 131) and component B2) for chain extension.

Components B1) used are preferably organic di- or polyamines for example ethylene-1,2-diamine, 1,2- and 1,3-diaminopropane, 1,4-diaminobutane, 1,6-diaminohexane, isophoronediamine, isomer mixture of 2,2,4- and 2,4,4-trimethylhexamethylenediamine, 2-methylpentamethylenediamine, diethylenetriamine, 4,4-diaminodicyclohexylmethane, hydrazine hydrate and/or dimethylethylene-diamine.

In addition, it is also possible to use, as component B1), compounds which, as well as a primary amino group, also have secondary amino groups or, as well as an amino group (primary or secondary), also have OH groups. Examples of these are primary/secondary amines such as diethanolamine, 3-amino-1-methylaminopropane, 3-amino-1-ethylaminopropane, 3-amino-1-cyclohexyl-aminopropane, 3-amino-1-methylaminobutane, alkanolamines such as N-aminoethylethanolamine, ethanolamine, 3-aminopropanol, neopentanolamine.

Furthermore, it is also possible to use, as component B1), monofunctional isocyanate-reactive amine compounds, for example methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine, or suitable substituted derivatives thereof, amide amines formed from di-primary amines and monocarboxylic acids, mono-ketime of di-primary amines, primary/tertiary amines such as N,N-dimethylaminopropylamine.

Suitable components B1) are also dihydrazides, for example adipic dihydrazide, oxalic dihydrazide, carbohydrazide and succinic dihydrazide. Likewise useful as component B1) are relatively long-chain amino-functional compounds such as polyetheramines ("Jeffamines").

Preference is given to using, as component B1), ethylene-1,2-diamine, bis(4-aminocyclohexyl)-methane, 1,4-diaminobutane, isophoronediamine, ethanolamine, diethanolamine and diethylenetriamine.

Particular preference is given to accomplishing chain extension using at least one component B2) having an anionically hydrophilizing effect. Such amines of component B2) preferably contain a sulphonic acid or sulphonate group, more preferably a sodium sulphonate group. Suitable anionically hydrophilizing compounds as component B2) are especially the alkali metal salts of the mono- and diaminosulphonic acids. Examples of such anionic hydrophilizing agents are salts of 2-(2-aminoethylamino)ethanesulphonic acid, ethylenediaminepropyl- or -butylsulphonic acid, propylene-1,2- or -1,3-diamine-β-ethylsulphonic acid or taurine. In addition, it is possible to use the salt of cyclohexylaminopropanesulphonic acid (CAPS) from WO-A 01/88006 as anionic hydrophilizing agent.

Particularly preferred anionic hydrophilizing agents B2) are those containing sulphonate groups as ionic groups and two amino groups, such as the salts of 2-(2-aminoethylamino)ethylsulphonic acid and propylene-1,3-diamine-β-ethylsulphonic acid.

Optionally, the anionic group in component B2) may also be a carboxylate or carboxylic acid group. In that case, component B2) is preferably selected from diaminocarboxylic acids, for example sodium N-(2-aminoethyl)-β-alaninate.

As well as the nitrogen compounds indicated here, chain extension of the prepolymers containing isocyanate groups can also be conducted by means of water. In this case, the isocyanate groups of the prepolymer react with water, eliminating $CO_2$, to give an amine group which can then react further with further isocyanate groups present to give the urea.

Hydrophilization can also be accomplished using mixtures of anionic hydrophilizing agents B2) and nonionic hydrophilizing agents.

If chain extension is accomplished using anionic hydrophilizing agents corresponding to the definition B2) with $NH_2$ or NH groups, the chain extension of the prepolymers preferably precedes the dispersion.

The degree of chain extension, i.e. the ratio of equivalents of NCO-reactive groups in the compounds used for chain extension and chain termination to free NCO groups in the prepolymer, is generally between 40% and 150%, preferably between 50% and 110%, more preferably between 60% and 100%.

The aminic components B1) and B2) can optionally be used in water- or solvent-diluted form in the process according to the invention, individually or in mixtures, in principle with any possible sequence of addition. Said components are preferably used in water-diluted form.

When water or organic solvent is used in part as diluent, the diluent content in the component used for chain extension is preferably 40% to 95% by weight.

The chain extension typically takes place within a temperature range from 20 to 100° C., preferably from 25 to 80° C. and more preferably from 30 to 60° C. The reaction time depends on a few parameters, such as reactivity, temperature, dilution and viscosity of the prepolymer or the reaction mixture, and is typically between 1 to 120 min., preferably from 2 to 60 min. and more preferably from 5 to 30 min.

In a particularly preferred embodiment, at least 2, 3, 4 or 5 chain-extending reagents are introduced in mixing element M1 (embodiment 1) or M3 (embodiment 2).

A particularly preferred prepolymer is prepared from a polyester formed from adipic acid, hexane-1,6-diol and neopentyl glycol, and hexamethylene diisocyanate. The polyester preferably has a molar mass of 1700 g/mol.

A particularly preferred chain-extending reagent is 2-(2-aminoethylamino)ethanesulphonic acid.

A preferred polyurethane dispersion to be prepared by the process according to the invention contains 9% to 60% by weight of a polyisocyanate compound, 35% to 90% by weight of an isocyanate-reactive polyol having a molar mass of >500 g/mol, 0.5% to 5% by weight of an ionic or potentially ionic hydrophilizing agent and 0.5% to 10% by weight of a chain extender amine having no hydrophilic groups.

In a particularly preferred embodiment, the polyurethane dispersion contains at least one addition selected from the group consisting of 0.1% to 25.0% by weight of a nonionic hydrophilizing agent, 0.1% to 15.0% by weight of a further polyol having a molar mass of <500 g/mol and 0.1% to 3.0% by weight of further auxiliaries or additives, especially emulsifiers, biocides, ageing stabilizers.

The study on which the present patent application is based has surprisingly shown that particularly stable dispersions are obtained when the water added for dispersion is added not in one step but in two successive steps.

Compared to the prior art, much lower energy inputs are required with the process according to the invention for the creation of a stable dispersion. U.S. Pat. No. 4,879,322, which likewise describes reduced energy inputs compared to the rest of the prior art, achieves this by a combination of rotor and stator. A disadvantage here is that the use of moving parts leads to increased wear. Different shear forces also occur locally in the system described, and these can lead to a different viscosity of the dispersion, since the viscosity of a dispersion depends on the shear forces.

Apparatus

A further embodiment of the present invention relates to an apparatus suitable for performance of a process for continuously producing an aqueous polyurethane dispersion, comprising a) a first mixing element M1 having at least one first inlet Z1 and at least one second inlet Z2, said inlets being arranged such that liquids from both inlets can be introduced simultaneously into said mixing element;
b) a second mixing element M2 connected to the mixing element M1 and at least one inlet Z3 such that the liquids withdrawn from M1 and the inlet can be introduced simultaneously into said mixing element; and
c) a mixing element M3 which is connected to the mixing element M2 and at least one inlet Z4 such that the liquids withdrawn from M2 and Z4 can be introduced simultaneously into the mixing element M3.

In a first preferred embodiment, the inlet Z1 is designed for the supply of at least one prepolymer solution and inlet Z2 for the supply of a solution of at least one chain-extending reagent. In addition, Z3 and Z4 are designed for the supply of water.

In a second preferred embodiment, the inlet Z1 is designed for the supply of at least one prepolymer solution and inlet Z2 for the supply of water. In addition, Z3 is designed for the supply of water and Z4 is designed for the supply of at least one solution of a chain-extending reagent.

In a preferred embodiment, the mixing elements M1, M2 and M3 are connected such that liquids can be conveyed with minimum time delay from M1 to M2 and then from M2 to M3.

In a more preferred embodiment, delay zones are arranged between M1 and M2, between M2 and M3 or after M3, such that the liquid leaving a mixing element passes through the delay zone before it is guided into the next mixing element or discharged from the apparatus. Preferably, the delay zones take the form of a pipe or hose. More preferably, the delay zones are formed from a plurality of segments arranged in series, such that the duration of the delay time in the delay zone can be adjusted by varying the length of the delay zone. If more segments are arranged in series, the delay time is prolonged. If the number of segments is reduced, the delay time is shortened.

In a preferred embodiment, at least one of the delay zones selected from the group consisting of VZ1, VZ2 and VZ3 comprises at least one mixing element nonidentical to M1, M2 or M3. Suitable mixing elements are those from the group of the static mixers. Particularly suitable static mixers are those which also give good mixing in the laminar range. Very particularly suitable static mixers are those of the design as also supplied in the form of the SMX model from Sulzer Ltd., Winterthur, Switzerland.

In a preferred embodiment of the invention, additional feeds for an organic solvent are disposed in the mixing elements M1, M2 and M3. As an alternative, the solvent may be guided into the feeds Z1, Z2, Z3 or Z4. It is preferable here that the solvent is supplied very shortly before the respective feed opens into the mixing element.

Feeds used for liquids may be any devices known to those skilled in the art, preferably pipes or hoses. It will be apparent that the feed and the requisite valves and seals must be stable to the liquid which flows through the feed.

In a preferred embodiment, the inlets are connected to reservoir vessels suitable for accommodating the liquid to be introduced by the respective feed. Preferably, each feed is connected to at least 1, 2 or 3 reservoir vessels.

If a plurality of feeds are used for the introduction of the same liquids into the same or different mixing elements, it is preferable to connect said feeds to a single reservoir vessel.

The conveying of the liquid through the feed into the mixing element can be effected in any manner known to those skilled in the art. Preference is given to the use of one or more pumps. Additionally preferable is conveyance by virtue of the liquid's own weight, in that the reservoir vessel is mounted higher than the mixing element to be supplied from the reservoir vessel. Conveying by elevated pressure is also in accordance with the invention.

The dimensions of the feeds have to be such that they produce, given a flow rate achievable by the conveying method chosen, a volume flow rate that meets the requirements of the process according to the invention.

Uses

In a further embodiment, the invention relates to the use of a microstructured mixing element in a process for continuously producing an aqueous polyurethane dispersion.

Preference is given to the processes described in this application for continuous production of aqueous polyurethane dispersions.

Preferably, in the case of the inventive use, the energy input in the mixing element is below 20 W/cm$^3$, more preferably below 10 W/cm$^3$, even more preferably below 5 W/cm$^3$, even more preferably below 2.5 W/cm$^3$ and most preferably below 1 W/cm$^3$.

In a further preferred embodiment, the invention relates to the use of a delay zone having variable residence time in a process for continuous production of an aqueous polyurethane dispersion.

Preference is given to the processes described in this application for continuous production of aqueous polyurethane dispersions.

In a further embodiment, the invention relates to the use of one of the apparatuses described in this application in a process for continuous production of an aqueous polyurethane dispersion.

BRIEF DESCRIPTION OF THE FIGURES

FIG. 1 shows a schematic of the construction of an apparatus for performance of the process according to the invention. The mixing element M1 has two feeds Z1 and Z2. The liquid stream leaving the mixing element M1 is conducted into a second mixing element M2, where a further liquid stream is metered in via a feed Z3. The connection between the mixing elements M1 and M2 may optionally contain a delay zone VZ1. The liquid stream leaving the mixing element M2 is conducted into a third mixing element M3, where a further liquid stream is metered in via a feed Z4. The connection between the mixing elements M2 and M3 may optionally contain a delay zone VZ2. In addition, a delay zone VZ3 may optionally be connected to the outlet of the mixing element M3.

The working examples which follow serve merely to illustrate the invention. They are not intended to restrict the scope of protection of the claims.

EXAMPLE 1 (INVENTIVE)

1.1 Raw Materials

Polyester 170 HN (170 HN): polyester polyol formed from adipic acid, hexane-1,6-diol and neopentyl glycol having a molar mass of 1700 g/mol (BAYER AG, DE, Leverkusen)

Desmodur H (HDI): hexamethylene diisocyanate (BAYER AG, DE, Leverkusen) Ethylenediamine (EDA, ALDRICH, DE)

AAS solution: 45% aqueous solution of the sodium salt of 2-(2-aminoethylamino)ethanesulphonic acid (BAYER AG, Leverkusen, DE)

1.2 Methods

The solids contents (SC) were determined in accordance with DIN-EN ISO 3251.

The median particle sizes (MPS) were determined by means of photocorrelation spectroscopy (Malvern Instruments, model: Zetasizer 1000)

The NCO content was determined by volumetric means in accordance with DIN-ISO 11909. The mechanical properties of the PU dispersions are determined on free films which are produced as follows:

In a film applicator consisting of two polished rolls which can be set at an exact distance, a release paper is inserted ahead of the rear roll. A feeler gauge is used to set the distance between paper and front roll. This distance corresponds to the (wet) film thickness of the resulting coating and can be set to the desired application of each coat. Coating is also possible consecutively in several coats.

To apply the individual coats, the products, after the viscosity has been adjusted by adding anionic acrylic polymer to 4500 mPa·s, are poured into the gap between paper and front roll; the release paper is pulled away vertically downward, forming the corresponding film on the paper. If several coats are to be applied, each individual coat is dried and the paper is reinserted.

Drying conditions: 70° C. to dry, then 3 minutes at 150° C.

1.3 Continuous Prepolymer Synthesis

A prepolymer (90.7% by weight) consisting of the 170 HN polyester (30.6% by weight), HDI (5.4% by weight) and acetone (64.0% by weight) is mixed in the mixer M1 with a chain-extending reagent (9.3% by weight) consisting of AAS solution (19.9% by weight), EDA (3.1% by weight) and water (77.0% by weight) at 40° C. and left to react in the delay zone VZ1 at 40° C. for 5 min.

The mixture (70.2% by weight) is mixed at 40° C. in the mixer M2 with the first portion of water (11.9% by weight). Thereafter, the mixture runs through the delay zone VZ2 for about 2 min before being mixed in the mixer M3 with the second portion of water (17.9% by weight). The percentages by weight are based on the total weight of the dispersion.

The resulting mixture is guided through the delay zone VZ3 for another <1 min, before being collected in the product vessel. The remaining acetone is distilled out of this crude dispersion at 40° C. and a pressure of 120 mbar, giving rise to a solvent-free, storage-stable polyurethane dispersion having the characteristics listed in Table 1.

TABLE 1

Characteristics of the example dispersion.

| Ex. | SC [% by wt.] | pH | MPC [nm] | 100% modulus [N/mm$^2$] | Tensile strength [N/mm$^2$] | Elongation at break [% by wt.] |
|---|---|---|---|---|---|---|
| 1 | 41.0 | 6.1 | 249 | 1.6 | 40.6 | 1778 |

EXAMPLES 2 TO 8

Raw materials and methods:
LB 25: Monofunctional polyether based on ethylene oxide/propylene oxide having an ethylene oxide content of 84%, OH number 25, Mn=2250 g/mol (Covestro AG, DE).
Desmophen 1652: Linear polyester diol with a molecular weight Mn of 2000 g/mol (Covestro AG, DE, Leverkusen).
Desmophen C2200: Linear polycarbonate diol with a molecular weight of 2000 g/mol (Covestro AG, DE, Leverkusen).
Polyester 225 B: Linear polyester diol with a molecular weight of 2250 g/mol (Covestro AG, DE, Leverkusen).
IPDI: Desmodur I, isophorone diisocyanate (Covestro AG, DE).
HDI: Desmodur H, 1,6-hexamethylene diisocyanate (Covestro AG, DE).
H12MDI: Desmodur W, dicyclohexylmethan-4,4 diisocyanate (Covestro AG; DE, Leverkusen).
IPDA: Isophoronediamine (Covestro AG, DE).
AAS: Diaminosulfonate, sodium salt, 45% in water, $H_2N-CH_2-CH_2-NH-CH_2-CH_2-SO_3Na$ (Covestro AG, DE).
DEA: Diethanolamine (Aldrich, DE)
EDA: Ethylenediamine (Aldrich, DE)
DMPA: Dimethylolpropionic acid (Aldrich, DE)
TEA: Triethylamine (Aldrich, DE)
PUD: Polyurethane Dispersion Standard Procedure for the Synthesis of the Prepolymers Used in the Continuous Process:

The polyol or the polyol mixture is added into a stainless steel reactor with 16 L volume and heated up to 70° C. As soon as the temperature is achieved the polyisocyanate or polyisocyanate mixture is added within a few minutes and the reaction temperature is increased to 100° C. The reaction mixture is stirred until the theoretical NCO value is achieved and the prepolymer is cooled down to 90° C. Acetone is added to obtain clear and colorless solutions with a solid content of 50 wt-%. The NCO value is determined according to DIN-EN ISO 11909.

EXAMPLE 2

A prepolymer (94.8 wt %) which is based on polyester diol (PE 225 B) (34.1 wt %), IPDI (1.5 wt %), HDI (2.3 wt %) and acetone (56.9 wt %) is mixed in M1 with a chain extension agent (5.2 wt %) composed of an AAS-solution (19.3 wt %), DEA (3.8 wt %) and water (76.9 wt %) at 48° C. The reaction takes place in a heat exchanger VZ1 at 48° C.

The mixture (64.6 wt %) is mixed with a first part of water in the valve mixer at 48° C. In mixer M2 the first part of water (14.2 wt %) is added. After a short retention time the mixture is mixed with the second part of water (21.2 wt %) at M3.

The obtained dispersion is collected and acetone is distilled off at 40° C. and at a pressure of 120 mbar.

The properties of the solvent-free PU dispersions are determined as follows:

Determination of solid content (SC) is done by DIN-EN ISO 3251.

Determination of the mean particle size was done through dynamic light scattering (Malvern Instruments, Type: Zetasizer 1000)

Determination of pH value is done by DIN 19621.

The characterization of the solvent-free PU dispersions is performed identical for example 2-7 and is listed in table 5. The pressure drops at the valve mixers M1, M2 and M3 for the product side and the solvent side are listed in table 6.

Comparative Example 2a (Batch Process)

2.4 wt % of HDI and 1.6 wt % of IPDI were added at 60° C. to 36.0 wt % PE 225 B and then reacted at 80° C. to the prepolymer until the theoretical NCO value (NCO-1=1.18%) was reached. 60.0 wt % of acetone were added at 80° C., the mixture is cooled to 48° C. and the prepolymer was dissolved.

5.2 wt % of a chain-extending solution, which was based on AAS-solution consisting of (19.3 wt %), DEA (3.8 wt %) and water (76.9 wt %), was added to 94.8 wt % of the prepolymer. The solution was stirred for 60 minutes at 48° C. 64.6 wt % of the mixture was dispersed in 35.4 wt % of water. Acetone was distilled off at 120 mbar and 40° C.

This example shows the continuous production of PUDs compared to the standard batch process. The characterization of the PUDs shows identical properties for both techniques.

EXAMPLE 3

The prepolymer solution (55.1 wt %) consisting of a linear polyester diol (DE 1652) (37.2 wt %), DMPA (1.4 wt %), IPDI (10.9 wt %), TEA (1.0 wt %) and acetone (49.5 wt %) was mixed with the first part of water (17.7 wt %) at mixer M2 at 25° C. At mixer M3 the second part of water (27.2 wt %) was mixed to the liquid.

The mixture (94.3 wt %) was mixed with a chain extension agent (5.7 wt %) at 25° C. The chain extension agent consisted of IPDA (25.4 wt %) and water (74.6 wt %). The obtained dispersion was collected and acetone is distilled off at 40° C. and at a pressure of 120 mbar.

Comparative Example 3a (Batch Process)

10.9 wt % of IPDI were added to 37.2 wt % DE 1652 and 1.4 wt % DMPA at 70° C. and then reacted to the prepolymer until the theoretical NCO value (NCO-1=3.42%) was reached at 100° C. 49.5 wt % of acetone were then added at 90° C. and 1.0 wt % of TEA are added at 80° C. The mixture is cooled to 50° C.

55.1 wt % prepolymer was dispersed in 44.9 wt % of water. 5.7 wt % chain-extending solution based on 25.4 wt % IPDA and 74.6 wt % water was added to the mixture (94.3 wt %), and stirring was carried out for 120 minutes at 50° C. Then the acetone was distilled off at 120 mbar and 40° C.

This example shows the flexibility of the new technology. The example shows that the reverse procedure, first dispersing the prepolymer in water and then mixing the dispersion with a chain extension solution, obtains stable PUDs.

EXAMPLE 4

A prepolymer solution (92.8 wt %) consisting of a linear polyester carbonate (C2200) (26.9 wt %), DMPA (1.0 wt %), IPDI (7.9 wt %), TEA (0.8 wt %) and acetone (63.5 wt %) was combined with a chain extension agent (7.2 wt %) in mixer M1 at 25° C. The chain extension agent was based on IPDA (19.9 wt %) and water (80.1 wt %). The reaction took place immediately.

The mixture (62.6 wt %) was mixed with the first part of water (15.0 wt %) at M2 at 25° C. and the second part of water (22.5 wt %) was added in M3. The obtained dispersion was collected and acetone was distilled off at 40° C. and at a pressure of 120 mbar.

Comparative Example 4a (Batch Process)

7.9 wt % of IPDI were added to 26.9 wt % C2200 and 1.0 wt % DMPA at 70° C. and then reacted to the prepolymer until the theoretical NCO value (NCO-1=3.42%) was reached at 100° C. 63.5 wt % of acetone were then added at 90° C. and 0.8 wt % of TEA were added at 40° C.

7.2 wt % of a chain-extending solution consisting of 19.9 wt % IPDA and 80.1 wt % water, was added to 92.8 wt % of the prepolymer. Stirring was carried out for 15 minutes at 40° C. 62.6 wt % product was dispersed in 37.4 wt % water. Then the acetone was distilled off at 120 mbar and 40° C.

Example 4 shows that various polyols can be employed to the system. In this example a linear polycarbonate diol is used. The continuous process obtained the desired smaller particle size compared to the batch process.

EXAMPLE 5

A prepolymer solution consisting of polyester diol (PE 225 B) (43.4 wt %), IPDI (1.9 wt %), HDI (2.9 wt %) and acetone (51.8 wt %) was diluted with acetone to reduce the viscosity. In mixer M1 the diluted prepolymer and the chain extension solution were mixed at 48° C. The chain extension solution was based on AAS-solution consisting of (19.3 wt %), DEA (3.8 wt %) and water (76.9 wt %). Table 2 shows the dilution of acetone and the corresponding addition of chain extension (CE) solution and water.

TABLE 2

Dilution series of prepolymer with the adjusted CE-solution.

| sample | prepolymer (wt %) | acetone (wt %) | CE-solution (wt %) | water (wt %) |
|---|---|---|---|---|
| 5 a | 85.3 | 9.5 | 4.7 | 0.5 |
| 5 b | 75.8 | 19.0 | 4.2 | 1.0 |
| 5 c | 66.4 | 28.4 | 3.6 | 1.6 |

The mixture (70.2 wt %) was mixed with the first part of water (11.9 wt %) at M2 at 48° C. After a short retention time of few minutes the second part of the water (17.9 wt %) was mixed to M3. The obtained dispersion was collected and acetone is distilled off at 40° C. and at a pressure of 120 mbar.

In this example the effect of changing the viscosity of the prepolymer on the obtained particle size is shown. By reducing the viscosity and the solid content the particle size decreases.

EXAMPLE 6

A prepolymer solution (92.4 wt %) consisting of a linear polyester diol (DE 1652) (25.9 wt %), DMPA (1.0 Gew. %), Desmodur W (8.9 wt %), TEA (0.7 wt %) and acetone (63.5 wt %) was mixed with a chain extension agent (7.6 wt %) in M1 at 25° C. The chain extension agent consisted of DEA (9.0 wt %), EDA (7.7 wt %) and water (83.4 wt %).

The mixture (63.0 wt %) was mixed with a first part of water (14.8 wt %) in M2 and then the second part of water (22.2 wt %) was added in M3. The obtained dispersion was collected and acetone was distilled off at 40° C. and at a pressure of 120 mbar.

Comparative Example 6a (Batch Process)

8.9 wt % of Desmodur W were added to 25.9 wt % DE 1652 and 1.0 wt % DMPA at 70° C. and then reacted to the prepolymer until the theoretical NCO value (NCO-1=3.29%) was reached at 100° C. 63.5 wt % of acetone were then added at 90° C. and 0.7 wt % of TEA were added to the mixture at 40° C.

7.6 wt % of chain-extending solution consisting of 7.7 wt % EDA, 9.0 wt % DEA and 83.3 wt % water was added to 92.4 wt % of the mixture. Stirring was carried out for 15 minutes at 40° C. 63.0 wt % of the product was dispersed in 37.0 wt % water. Then the acetone was distilled off at 120 mbar and 40° C.

Example 6 shows that various polyisocyanates can be employed. The comparison of batch vs. continuous process shows that smaller particles, which are desired, can be obtained with the new technology.

EXAMPLE 7

94.8 wt % of a prepolymer solution consisting of polyester diol (PE 225 B) (36.0 wt %), IPDI (1.6 wt %), HDI (2.4 wt %) and acetone (60.0 wt %) was mixed with a chain extension solution (5.2 wt %) in M1 at 48° C. The chain extension solution is based on AAS-solution, DEA and water. The exact amount added to the prepolymer is listed in table 3.

TABLE 3

Variation of AAS-solution.

| Sample | prepolymer (wt %) | CE solution (wt %) | H$_2$O (wt %) | CE solution DEA (wt %) | AAS (wt %) |
|---|---|---|---|---|---|
| 7 a | 94.8 | 5.2 | 78.9 | 3.8 | 17.3 |
| 7 b | 94.8 | 5.2 | 74.9 | 3.8 | 21.27 |

The first part of water (14.1 wt %) was added to the mixture (64.6 wt %) in M2 at 48° C. The second part of water (21.2 wt %) was added in M3. The obtained dispersion was collected and acetone was distilled off at 40° C. and at a pressure of 120 mbar.

Example 7 shows the effect of the variation the amount of AAS-solution on the properties of the PUDs. The amount of hydrophilic groups in the mixture is correlated to the final particle size. Increasing the amount of AAS-solution decreases the particle size of PUDs.

EXAMPLE 8

In this example only the dispersion with water was done continuously.

A prepolymer solution (94.8 wt %) consisting of polyester diol (PE 225 B) (34.1 wt %), IPDI (1.5 wt %), HDI (2.3 wt %) and acetone (56.9 wt %) was mixed with a chain extension agent (5.2 wt %) composed of an AAS-solution consisting of (19.3 wt %), DEA (3.8 wt %) and water (76.9 wt %) at 48° C.

The mixture (64.6 wt %) was mixed with a first part of water in the valve mixer at 48° C. In mixer M2 the first part of water was added. After a short retention time the mixture was mixed with the second part of water at M3. The ratio of water added in M2 and M3 is listed in table 4, the total amount of water added to the final product was 35.4 wt %.

The obtained dispersion was collected and acetone was distilled off at 40° C. and at a pressure of 120 mbar.

TABLE 4

Water ratio of the two-stage water addition during the dispersion step.

| Sample | H$_2$O M2 (%) | H$_2$O M3 (%) |
|---|---|---|
| 8 a | 10 | 90 |
| 8 b | 20 | 80 |
| 8 c | 30 | 70 |
| 8 d | 40 | 60 |
| 8 e | 50 | 50 |

This example shows the impact of the water ratios in the dispersion step on the stability of the PUDs. Here, the ratio of water, which is added in M2 and M3, is changing. Only sample 8 d with a water ratio of 40:60 obtained stable dispersion.

TABLE 5

Characteristics of the solvent free PUDs.

| | particle size (nm) | pH-value | solid content (%) | stable/ not stable dispersion |
|---|---|---|---|---|
| Example 2: | | | | |
| Example 2 a | 191 | 6.38 | 40.1 | stable |
| Example 2 batch | 150-190 | 6.0-9.0 | 39-41 | stable |
| Example 3: First dispersion then CE | | | | |
| Example 3 a | 286 | 7.58 | 22.9 | stable |
| Example 3 batch | 173 | 7.9 | 34 | stable |
| Example 4: Variation Polyol | | | | |
| Example 4 a | 102 | 8.31 | 34.76 | stable |
| Example 4 batch | 128.3 | 8.16 | 35.75 | stable |
| Example 5: Variation of viscosity of prepolymer | | | | |
| Example 5 a | 228.7 | 6.5 | 36.4 | stable |
| Example 5 b | 174.3 | 6.4 | 26.1 | stable |
| Example 5 c | 173.3 | 6.4 | 16.2 | stable |
| Example 5 d | 125.7 | 7.1 | 7.2 | stable |
| Example 6: Variation PIC Desmodur W | | | | |
| Example 6 a | 228 | 9 | 36.2 | stable |
| Example 6 batch | 292.5 | 8.7 | 36.01 | stable |
| Example 7: Variation of AAS-solution | | | | |
| Example 7 a | 367 | 6.02 | 33.5 | stable |
| Example 7 b | 211 | 6.11 | 41.3 | stable |
| Example 8: Variation of the water ratio | | | | |
| Example 8 a | — | — | — | not stable |
| Example 8 b | — | — | — | not stable |
| Example 8 c | — | — | — | not stable |
| Example 8 d | 177 | 7.4 | 39.8 | stable |
| Example 8 e | — | — | — | not stable |

TABLE 6

Pressure drop at the valve mixers.

| Example | Δp M1 Prepolymer bar | Δp M1 CE Solution bar | Δp M2 Product side bar | Δp M2 Water bar | Δp M3 Product Side bar | Δp M3 Water bar |
|---|---|---|---|---|---|---|
| 2a | 0.85 | 0.75 | 4.01 | 0.46 | 2.55 | 1.03 |
| 3a | 0.79 | 2.59 | 0.23 | 0.15 | 1.02 | 2.16 |
| 4a | 1.70 | 2.11 | 0.71 | 0.17 | 0.20 | 1.02 |
| 5a | 0.33 | 0.14 | 1.08 | 0.31 | 0.75 | 1.19 |
| 5b | 0.17 | 0.16 | 0.56 | 0.31 | 0.43 | 1.26 |
| 5c | 0.07 | 0.16 | 0.36 | 0.38 | 0.29 | 1.41 |
| 5d | 0.03 | 0.24 | 0.16 | 0.22 | 0.18 | 1.49 |
| 6a | 0.08 | 2.35 | 0.41 | 0.18 | 0.21 | 1.27 |
| 7a | 0.55 | 0.24 | 1.03 | 0.26 | 0.30 | 0.49 |
| 7b | 0.50 | 0.37 | 1.27 | 0.33 | 0.51 | 0.64 |

The invention claimed is:

1. A process for continuously producing an aqueous polyurethane dispersion, comprising the steps of
    a) simultaneously introducing at least one prepolymer and at least one chain-extending reagent into a mixing element M1;
    b) subsequently simultaneously introducing the chain-extended prepolymer formed in process step a) and water into a mixing element M2; and
    c) subsequently simultaneously introducing the mixture formed in process step b) and water into a mixing element M3 to form an aqueous polyurethane dispersion.

2. The process according to claim 1, wherein 1%-99% by weight of the total amount of water added is added in mixing element M2 and the remainder to 100% by weight in mixing element M3.

3. The process according to claim 1, further comprising at least one of the steps of
   a1) flowing through a delay zone VZ1 between mixing elements M1 and M2;
   b1) flowing through a delay zone VZ2 between mixing elements M2 and M3; and
   c1) flowing through a delay zone after mixing element M3.

4. The process according to claim 1, wherein the prepolymer has been dissolved in an organic solvent.

5. The process according to claim 1, wherein the mixing elements are static mixing elements.

6. The process according to claim 5, wherein the mixing elements are micro structured mixing elements.

7. The process according to claim 1, wherein the energy input in at least one of the mixing elements M1 or M2 or M3 is below 20 W/cm$^3$.

8. The process according to claim 1, wherein the prepolymer is prepared from a polyester formed from adipic acid, hexane-1,6-diol and neopentyl glycol, and hexamethylene diisocyanate.

9. The process according to claim 1, wherein the chain-extending reagent is 2-(2-aminoethylamino)ethanesulphonic acid.

10. The process according to claim 8, wherein the chain-extending reagent is 2-(2-aminoethylamino)ethanesulphonic acid.

* * * * *